US009586839B2

(12) United States Patent
Strain

(10) Patent No.: US 9,586,839 B2
(45) Date of Patent: Mar. 7, 2017

(54) SYSTEM FOR WATER TREATMENT AND METHOD

(71) Applicant: Peter Strain, Shanty Bay (CA)

(72) Inventor: Peter Strain, Shanty Bay (CA)

(73) Assignee: 1720618 Ontario Inc., Barrie (CA)

( * ) Notice: Subject to any disclaimer, the term of this patent is extended or adjusted under 35 U.S.C. 154(b) by 135 days.

(21) Appl. No.: 14/109,035

(22) Filed: Dec. 17, 2013

(65) Prior Publication Data

US 2014/0175016 A1    Jun. 26, 2014

Related U.S. Application Data

(60) Provisional application No. 61/740,682, filed on Dec. 21, 2012.

(51) Int. Cl.
| | | |
|---|---|---|
| C02F 1/78 | (2006.01) | |
| C02F 1/42 | (2006.01) | |
| C02F 1/00 | (2006.01) | |
| C02F 1/28 | (2006.01) | |

(Continued)

(52) U.S. Cl.
CPC ............... *C02F 1/42* (2013.01); *C02F 1/008* (2013.01); *C02F 1/281* (2013.01); *C02F 1/78* (2013.01); *C02F 1/645* (2013.01); *C02F 2101/203* (2013.01); *C02F 2101/206* (2013.01); *C02F 2201/005* (2013.01); *C02F 2201/782* (2013.01);

(Continued)

(58) Field of Classification Search
CPC .... C02F 1/64; C02F 1/645; C02F 1/78; C02F 1/008
See application file for complete search history.

(56) References Cited

U.S. PATENT DOCUMENTS

| 3,421,625 A | 1/1969 | Fritz | |
|---|---|---|---|
| 4,640,782 A * | 2/1987 | Burleson | ................. A61L 2/202 |
| | | | 204/176 |

(Continued)

FOREIGN PATENT DOCUMENTS

| EP | 2433909 A1 | 3/2012 | |
|---|---|---|---|
| GB | 191019621 | 0/1910 | |
| WO | WO 0154786 A2 * | 8/2001 | ............. B01D 15/00 |

OTHER PUBLICATIONS

Office Action Issued Aug. 1, 2014 by Canadian Intellectual Property Office in connection with CA2836680.

(Continued)

*Primary Examiner* — Matthew O Savage
(74) *Attorney, Agent, or Firm* — Gilbert's LLP; Matthew D. Powell

(57) ABSTRACT

Embodiments of a water treatment system, a method of regenerating a water treatment system, a use of a water softener valve and an ozone kit for a water filtration system are provided. The water treatment system includes a water tank containing iron filtration media; an ozone gas source having an outlet; and a water softener valve having a venturi nozzle that is associated with the water tank and in fluid communication with the outlet of the ozone gas source, the water softener valve configured to invoke a regeneration mode during which the water softener valve controls backwashing of the iron filtration media and then permits ozone gas from the ozone gas source to be drawn through the venturi nozzle and into the water tank.

2 Claims, 3 Drawing Sheets

(51) Int. Cl.
*C02F 1/64* (2006.01)
*C02F 101/20* (2006.01)

(52) U.S. Cl.
CPC .. *C02F 2209/005* (2013.01); *C02F 2209/006* (2013.01); *C02F 2303/16* (2013.01)

(56) References Cited

U.S. PATENT DOCUMENTS

| | | | |
|---|---|---|---|
| 5,096,580 A * | 3/1992 | Auchincloss | C02F 1/74 210/202 |
| 5,236,722 A | 8/1993 | Schroeder | |
| 5,302,356 A | 4/1994 | Shadman et al. | |
| 6,006,387 A | 12/1999 | Cooper et al. | |
| 6,132,629 A * | 10/2000 | Boley | B01F 3/04985 210/167.11 |
| 6,287,515 B1 | 9/2001 | Koosman et al. | |
| 6,723,293 B2 | 4/2004 | Jensen | |
| 6,726,817 B1 | 4/2004 | Gruett | |
| 7,488,424 B2 | 2/2009 | Gruett et al. | |
| 7,563,361 B2 | 7/2009 | Gruett et al. | |
| 8,163,173 B1 | 4/2012 | Dellecave et al. | |
| 2002/0166817 A1 | 11/2002 | Gruett | |
| 2004/0016706 A1 | 1/2004 | Minnix | |
| 2004/0026451 A1 | 2/2004 | Jones | |
| 2004/0055969 A1 | 3/2004 | Barnes | |
| 2004/0154998 A1 | 8/2004 | Minnix | |
| 2005/0236338 A1 | 10/2005 | Minnix | |
| 2006/0027463 A1 | 2/2006 | Lavelle et al. | |
| 2009/0145820 A1 | 6/2009 | Gruett et al. | |
| 2010/0200522 A1 * | 8/2010 | Tischendorf | C02F 1/001 210/798 |
| 2011/0203978 A1 | 8/2011 | Handy | |
| 2012/0305488 A1 | 12/2012 | Gruett et al. | |
| 2013/0075313 A1 | 3/2013 | Handy | |
| 2013/0098845 A1 | 4/2013 | Gruett et al. | |
| 2013/0104742 A1 | 5/2013 | Deo et al. | |
| 2014/0166582 A1 | 6/2014 | Strain | |

OTHER PUBLICATIONS

Office Action Issued Nov. 19, 2014 by Canadian Intellectual Property Office in connection with CA2836680.

* cited by examiner

US 9,586,839 B2

SYSTEM FOR WATER TREATMENT AND METHOD

CROSS-REFERENCE TO RELATED APPLICATION

This application claims priority under 35 U.S.C. 119(e) from U.S. Provisional Patent Application Ser. No. 61/740,682 filed on Dec. 21, 2012.

FIELD OF THE INVENTION

The present invention relates generally to water treatment and in particular to a water treatment system, a regeneration method for a water treatment system, a use for a water softener valve, and an ozone kit for a water treatment system.

BACKGROUND OF THE INVENTION

Water filtration systems for removing iron, sulphur, manganese and other contaminants and sediments from water have long been in use. Dissolved iron can discolour water due to oxidation and can thereby cause stains on contact surfaces of bathtubs and sinks or on clothing being washed. Sulphur tends to have an unpleasant odour. Water that has been filtered of these contaminants is more pleasant to drink, cook and wash with, and otherwise use.

Filtration systems are often positioned near to where water enters a home, office, or industrial building from an external source, such as a well or municipal water distribution system, so that the water can be filtered of the contaminants prior to any water softening and further distribution and use. Such systems typically comprise a water tank storing a filtration media and a control system for switching between a service mode and a regeneration mode.

During service mode, water entering the filtration system is caused to pass through the filtration media within the water tank before exiting the filtration system for further processing or use. The filtration media may be birm, greensand or similar material. Birm media is typically used for removing iron and manganese. If sulphur levels in the water are very high, then greensand is often used as it can filter out iron and manganese and in addition is more effective for filtration of the sulphur. The filtration media serves to capture the contaminants thereby to filter the water. In time, as more and more filtered water is produced, the continued filtration leads to a condition in which there is a high concentration of contaminants in the filtration media, such that further incoming water will not undergo effective filtration. As such, the filtration media must be regenerated.

During regeneration the control system exits service mode and enters regeneration mode. This typically involves backwashing the water tank with source water to unsettle and push up the filtration media to dislodge captured contaminants and carry the captured contaminants from the water tank and out of the water filtration system and down a drain. After this operation, the filtration system having regenerated the treatment media can re-enter service mode.

Other water treatment systems are available for use alone or in addition to a filtration system for disinfecting water by removing organisms such as bacteria from the water before it is used. For example, it is known to bring ozone gas into contact with the water to be disinfected. Ozone gas can be very effective at killing waterborne organisms.

Ozone gas treatment systems may employ electric air pumps for injecting ozone gas into the water to be disinfected. Such ozone gas treatment systems are expensive and complex, and further require regular specialized servicing in order to continue to work effectively. Alternative systems employ water restricting devices to create suction in a line for suctioning ozone gas, using water pressure from a water supply pump. However, problems with effective suction of ozone gas arise when the water supply pump cannot produce a suitable amount of water pressure to accordingly produce a suitable amount of suction. Additional complex devices are also installed on a water tank to removing excess ozone gas from the water.

SUMMARY OF THE INVENTION

According to an aspect, there is provided a water treatment system comprising a water tank containing iron filtration media; an ozone gas source having an outlet; and a water softener valve having a venturi nozzle that is associated with the water tank and in fluid communication with the outlet of the ozone gas source, the water softener valve configured to invoke a regeneration mode during which the water softener valve controls backwashing of the iron filtration media and then permits ozone gas from the ozone gas source to be drawn through the venturi nozzle and into the water tank.

According to another aspect, there is provided a method of regenerating a water filtration system comprising backwashing iron filtration media within a water tank; and drawing ozone gas from an ozone gas source through a venturi nozzle of the water softener valve into the water tank.

According to another aspect, there is provided a use of a water softener valve to draw ozone gas into an iron filtration water tank during regeneration.

According to another aspect, there is provided an ozone kit for a water filtration system that comprises a water tank and a control system, the ozone kit comprising an ozone gas source configured to be controllable by the control system to begin and end releasing ozone gas for drawing through the venturi nozzle into the water tank; and a conduit configured to convey ozone gas from the ozone gas into the water tank via a venturi nozzle.

BRIEF DESCRIPTION OF THE DRAWINGS

Embodiments will now be described with reference to the appended drawings in which.

DETAILED DESCRIPTION

The following relates to use of a water softener valve to control a filtration system by handling backwashing of a water tank and also drawing ozone gas into the water tank itself during a draw cycle. While with other systems it is common to draw regenerating fluid such as chlorine into the water tank for helping with regenerating filtration media, the invention relates to a system and method involving a draw cycle of a water softener valve during which ozone gas is drawn into the water tank once the filtration media has been backwashed. The ozone gas is drawn into the tank in a manner so as to form a layer of ozone gas within the water tank that remains above both the filtration media and the water remaining therein. The addition of complex structures for bringing the ozone gas into contact with the water to be treated is not required, a high concentration of ozone gas is caused to be present in the layer, and any unused ozone gas and air simply remain at the top of the water tank instead of necessarily being introduced into the water that remains in the water tank. Employing a water softener valve's draw cycle to draw ozone gas into the water tank obviates the need for additional complex stages and structures for treating water with the ozone gas, and for other structures for removing excess ozone gas from the water. Effective integration of water filtration and water disinfection by way of the water softener valve can thereby be provided at a low initial installation cost, and can be maintained inexpensively.

Figure 1:
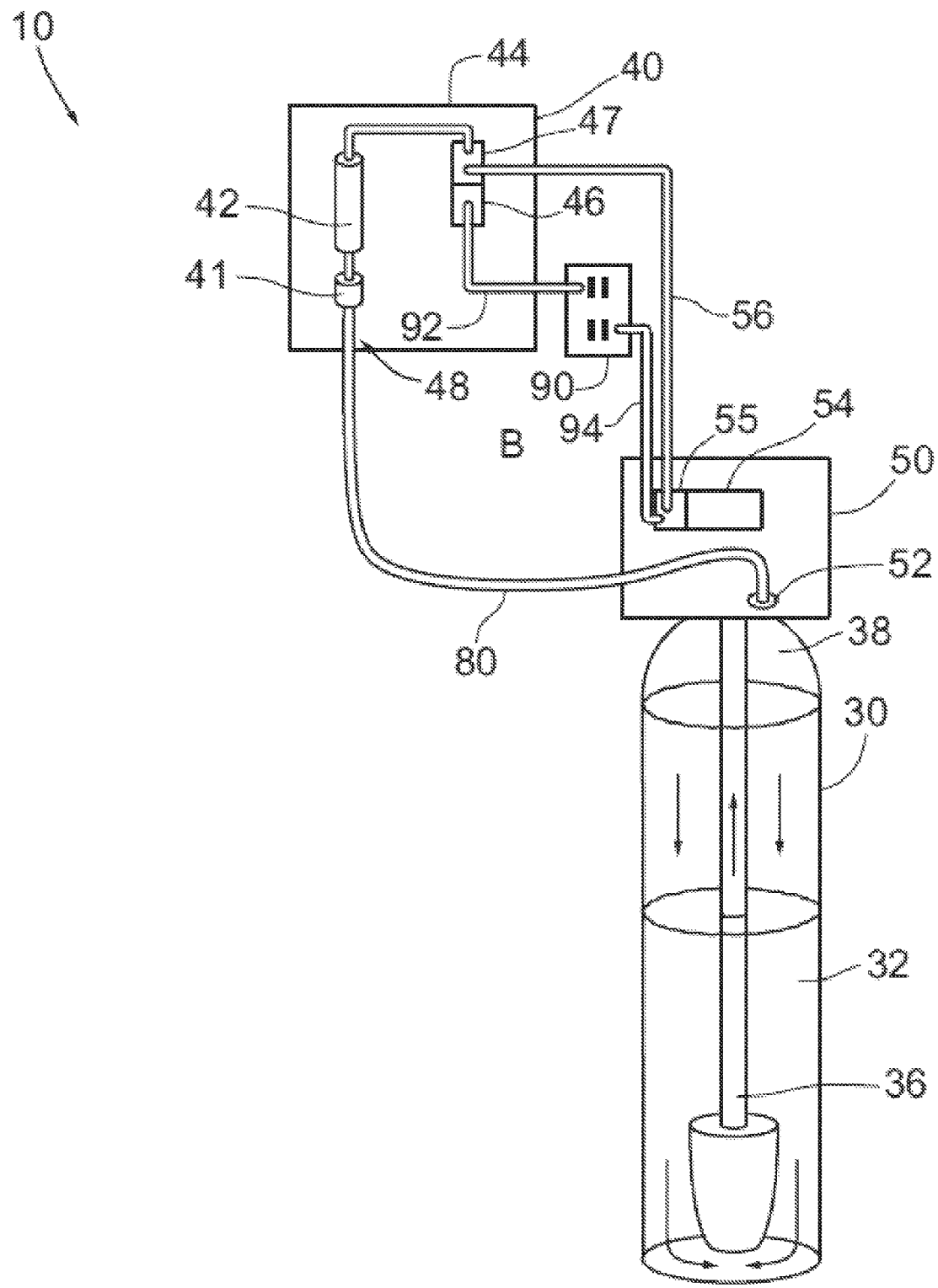
FIG. 1 is a schematic diagram of a water treatment system according to an embodiment.

Turning now to FIG. 1, there is shown a water treatment system 10 in accordance with one aspect of the invention. Water treatment system 10 generally includes a water tank 30, an ozone gas source 40, and a water softener valve 50.

Water tank 30 stores water filtration media which, in this embodiment, is birm suitable for filtering iron and manganese out of water. Water tank 30 further includes a riser tube 36 through which treated water is conveyed for use outside of the water treatment system 10

Also in this embodiment, water softener valve 50 is an electronic control valve, operating at pressures of between 20 and 125 psi (pounds per square inch). Water softener valve 50 includes electronic circuitry to transform a 115 VAC, 60 Hz supply into 12 VDC at 850 Ma (milliAmperes) or 10.2 Watts for operation of the water softener valve 50. Water softener valve 50 is rated to handle a temperature range of 40 to 115 degrees Fahrenheit. Water softener valve 50 includes a control system that includes a control board 54 and a relay terminal 55 for switching between operating modes.

In this embodiment, the ozone gas can be introduced into the water tank 30 as will be described in order to form an ozone gas layer 38 that remains at the top of the water tank 30.

Ozone gas source 40 incorporates an ozone gas generator 42 for generating ozone gas. Ozone gas generator 42 is positioned within a storage box 44 along with a control board 46 having a solid state relay switch 47 to which it is electrically connected. The solid state relay switch 47 is also electrically connected to relay terminal 55 of water softener valve 50 and thereby operable by water softener valve 50 via as will be described. In this embodiment, ozone gas generator 42 is a corona discharge ozone gas generator operating at 12 VDC from an 115V input to produce between 0.200 and 0.220 Milligrams/hour of ozone gas for conveying out of outlet 48 of ozone gas source 40. The rate of ozone output by the ozone gas source 40 is preferably adjustable by service personnel or a consumer based on various factors including the volume of the water tank 30, quality of source water, amount of ozone desired in the water tank 30, local regulations, and perhaps other factors.

The water softener valve 50 receives source water and, depending on the mode of the water treatment system 10, will direct the source water into the water tank 30 to be treated, will direct the source water into the water tank 30 for lifting and backwashing the water filtration media, or will permit ozone gas to be drawn into water tank 30 via a venturi nozzle 52.

Ozone gas source 40 and water softener valve 50 each receive input power from electrical reception outlet 90 via electrical cords 92 and 94, respectively, in a known manner.

During a service mode, source water to be treated is introduced into the water tank 30 so as to flow through the ozone gas layer 38 for purification prior to reaching the water filtration media 32 for filtering out iron and manganese and other contaminants. The resultant purified and filtered water is drawn through the riser tube 36 and out of the water treatment system 10 for use as drinking water or for other uses. The water softener valve 50 meters the water drawn out of water treatment system 10 in order to gauge whether it is appropriate to regenerate the water filtration media 32 so that it can be effective for filtering the water. Alternatively, the water softener valve 50 may simply be configured to periodically enter into a regeneration mode rather than metering the drawn water.

Figure 2:
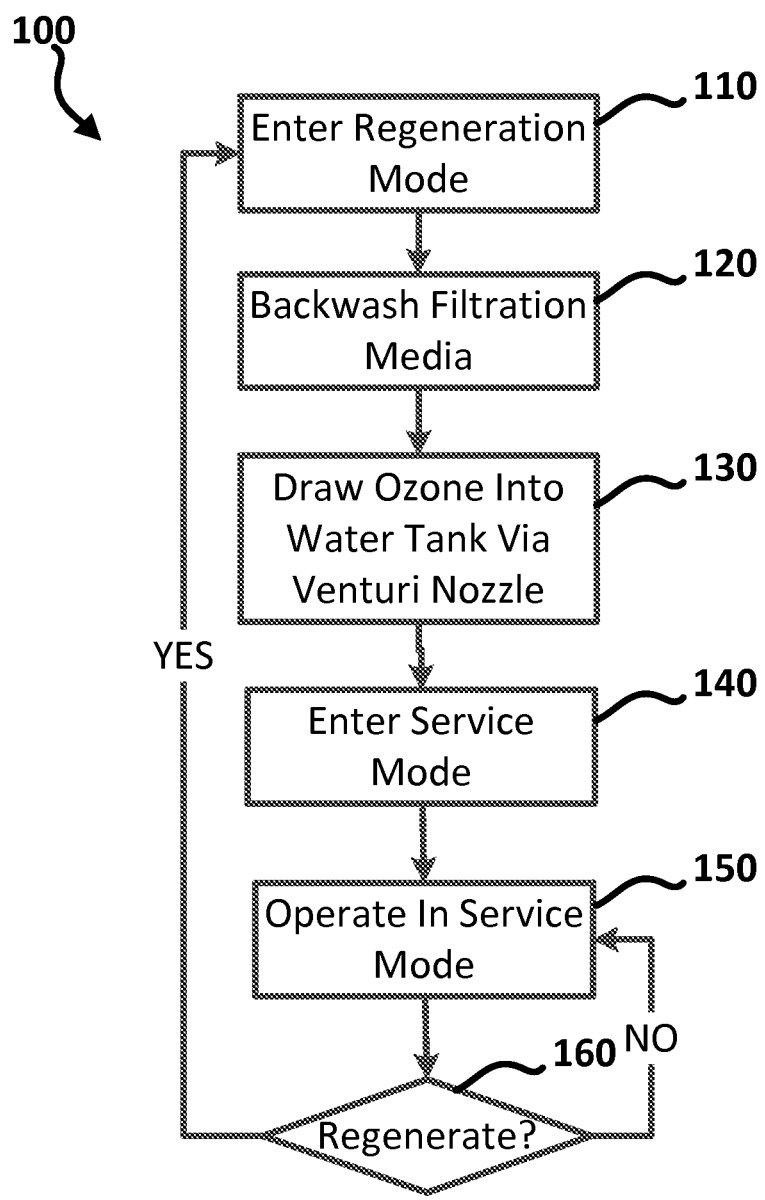
FIG. 2 is a flow diagram of a method for regenerating a water treatment system according to an embodiment.

A flow diagram of a method 100 for regenerating water treatment system 10 according to an embodiment is shown in FIG. 2. Once the water softener valve 50 causes water treatment system 10 to enter regeneration mode (step 110), water softener valve 50 begins to enable redirection of source water for backwashing the filtration media 32 during which water is forced into the water tank 30, lifting the water filtration media 32 for cleaning and discarding contaminants collected in the water filtration media 32 down a drain into the sewer or otherwise out of the water treatment system 10 (step 120).

Once the backwashing stage is complete, regeneration continues with the water softener valve 50 as control system signalling, via relay terminal 55, relay switch 47 of ozone gas source 40 to in turn cause ozone gas generator 42 to begin generating ozone gas. The water treatment system 10 enters a draw cycle during which suction induced at the venturi nozzle 52 causes vacuum to be imparted within conduit 80, which in turn opens check valve 41 of ozone gas source 40. This suction at venturi nozzle 52 is induced in a known manner. In particular, the water softener valve 50 receives a flow of source water and associates the flow of source water with the venturi nozzle 52 thereby to induce a low pressure zone at the venturi nozzle 52 that, in turn, causes a vacuum to be imparted within conduit 80. During this draw cycle, ozone gas is drawn from outlet 48 of ozone gas source 40 via conduit 80 and into the water tank 30 via venturi nozzle 52 (step 130).

In this embodiment, the water softener valve 50 is configured to send a signal along signal wire 56 once the previous steps of the regeneration have been completed in order to invoke the draw cycle. The signal may simply be in the form of a threshold change in DC voltage along the signal wire 56 that causes relay switch 47 to change states. This may be done by programming the water softener valve 50 to trigger the ON signal at the relay terminal 55 after a predetermined amount of time since regeneration began has expired, where the predetermined time corresponds to about the amount of time it would take to reach the end of the backwashing stage. For example, the predetermined time may be set at 10 minutes.

Water softener valve 50 permits a suitable volume of ozone gas to enter into water tank 30 to form a fresh ozone gas layer 38 at the top of water tank 30, above the regenerated water filtration media 32 and any water remaining therein. This is done by maintaining the ON signal at the relay terminal 55 in the water softener valve 50 for an amount of time corresponding to the time required for a suitable amount of ozone gas being produced to be conveyed into the water tank 30. Once the draw cycle is complete, water softener valve 50 then removes the ON signal at the relay terminal 55, to signal relay switch 47 to cause ozone gas generator 42 to cease production of ozone gas.

With the water filtration media 32 having been regenerated and the fresh ozone gas layer 38 having been introduced, the water softener valve 50 re-enters service mode (step 140) and operates in service mode (step 150) so that source water can enter water tank 30 from water softener valve 50 and be treated for use. During service mode (step 150), the source water entering water tank 30 passes through water softener valve 50 and into the top of water tank 30 such that it necessarily passes through ozone gas layer 38 for disinfecting before coming into contact with water filtration media 32 for filtering. Contact with the ozone gas layer 38 in this manner potentially treats the water sufficiently to kill bacteria, bacteria iron, sulphur reducing bacteria, and neutralize odour, as some examples.

In the event that water softener valve 50 determines that regeneration should be done again (step 160), the method re-enters regeneration mode (step 110) and repeats the process described above. Otherwise, the water treatment system 10 continues to operate in service mode (step 150).

In various implementations of the water treatment system 10, regeneration mode may include all regeneration steps as described above, or alternatively only a subset of these steps. For example, should the efficacy of the layer of ozone gas for disinfecting diminish significantly well before the water filtration media requires regeneration, it may be desirable to simply conduct another draw cycle to replenish the layer of ozone gas rather than conduct full regeneration. The ability to provide such granular control may depend in part upon the functionality made available through control board 54 of the water softener valve 50.

Figure 3:
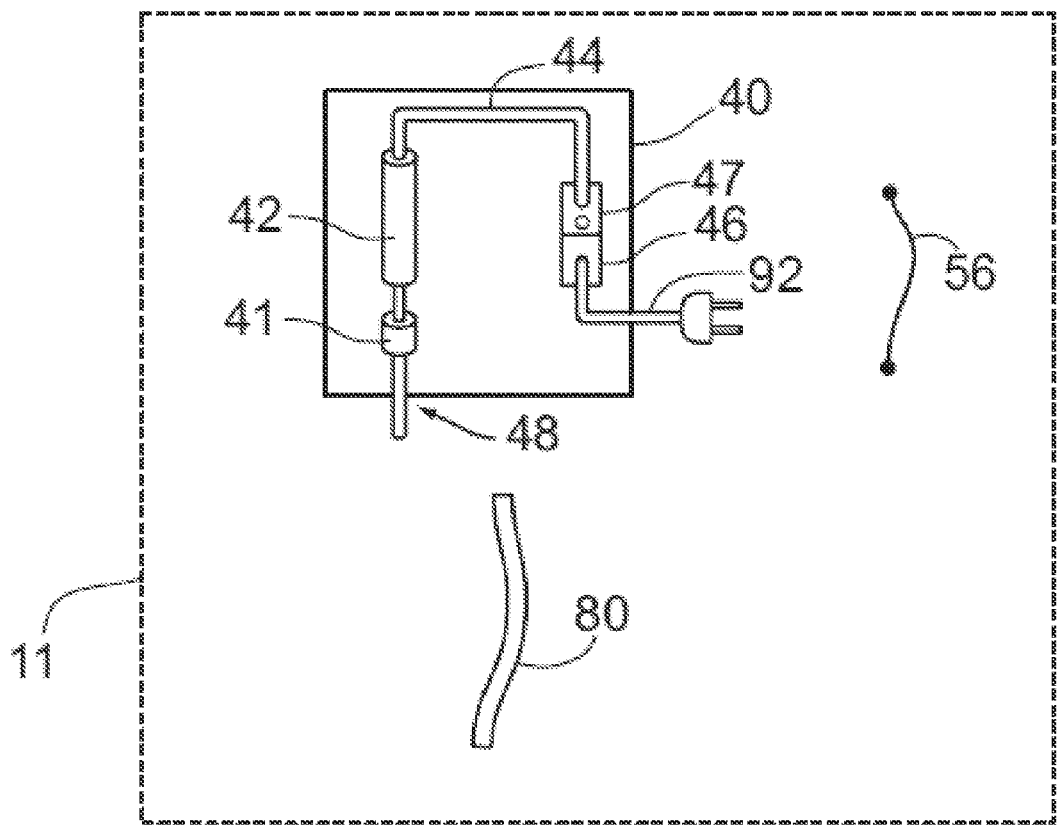
FIG. 3 is a schematic diagram of an ozone kit for a water treatment system according to an embodiment.

Ozone treatment may be provided as a supplement to an existing or installed water treatment system that includes a regenerating fluid source, a water tank and a control system, by way of an aftermarket kit, such as kit 11 shown in FIG. 3. Kit 11 could be made available to consumers in retail outlets and/or provided to service personnel as part of an upgrade service. For example, kit 11 could include an ozone gas source 40, a signal wire 56 and conduit 80 in the form of a plastic tube. The consumer or service personnel, perhaps with the guidance of an instruction manual, would arrange the components of the kit in relation to the existing water treatment system components as has been described above so as to supplement the existing water treatment system with the capability of providing the ozone for water treatment.

Although embodiments have been described with reference to the drawings, those of skill in the art will appreciate that variations and modifications may be made without departing from the spirit and scope thereof as defined by the appended claims.

For example, the solid state relay 47 may be replaced by a component that operates in substantially the same way to enable the water softener valve 50 to trigger the ozone gas source 40 to release ozone gas.

In an alternative embodiment, the ozone gas generator 42 may be triggered to generate ozone gas not directly by the control board 54 of water softener valve 50 as control system, but by other means. That is, embodiments are contemplated in which a direct or controlling association between water softener valve 50 and the ozone gas source 40 is not required in order to trigger release of ozone gas for conveying into water tank 30 via venturi nozzle 52.

Figure 4:
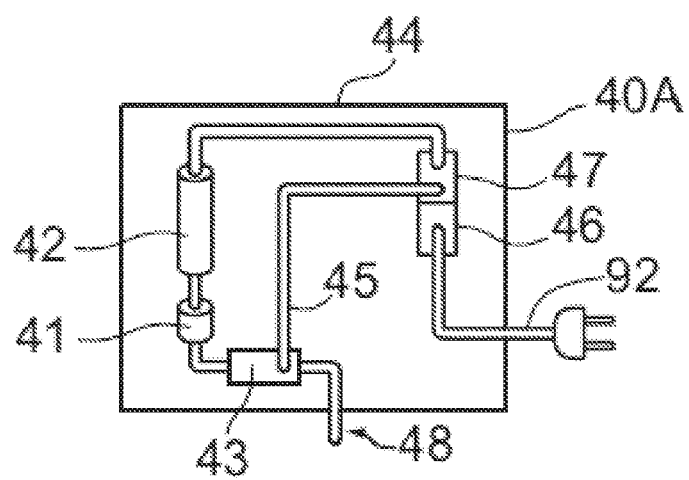
FIG. 4 is a schematic diagram of an ozone gas generator for a water treatment system according to an alternative embodiment.

For example, a schematic diagram of an alternative embodiment of an ozone gas source 40A for a water treatment system is shown in FIG. 4. In this embodiment, ozone gas source 40A includes a vacuum-activated switch 43, such as that provided by Ozotech Inc. of Yreka Calif., U.S.A. under part number 31503WC, that is configured to detect a threshold level of vacuum imparted to the outlet 48 of ozone gas source 40A, indicating that a draw cycle of regeneration has been initiated by water softener valve 50. In response, the vacuum switch 43 triggers relay switch 47 to cause ozone gas generator 42 begin generating ozone gas to be conveyed towards outlet 48 as it is being generated. Under the vacuum imparted by the water softener valve 50, the check valve 41 permits ozone gas being generated to exit ozone gas source 40 via outlet 48 to be conveyed along conduit 80 and into water tank 30 via venturi nozzle 52.

After an ozone gas draw period corresponding to the draw cycle of the water softener valve 50, the water softener valve 50 removes the suction from conduit 80, which in turn causes vacuum switch 43 to trigger ozone gas generator 42, via relay switch 47, to cease generating ozone gas.

Features of this embodiment may be provided in kit form, the kit including ozone gas source 40A, for coupling with a water treatment system that does not necessarily itself have features that can be programmed or otherwise configured to directly enable control of an ozone gas source in the manner described above.

In an alternative embodiment, the ozone gas source may be under the control of an independent timer that is synchronized with the timing of cycles of a water softener valve, to generate and release ozone gas at and for predetermined times that correspond to a draw cycle of the water softener valve.

Alternatives to the ozone gas source as described herein may be employed. For example, an ultraviolet, or ultraviolet vacuum type ozone gas generator may be employed for generating ozone gas, and work in substantially the same way in respect of the water treatment system described herein as the corona discharge-type ozone gas generator. Furthermore, an ozone gas source that comprises a tank of ozone gas, perhaps compressed ozone gas, may alternatively be employed and configured in a manner to release its stored ozone gas via its outlet under direction of the water softener valve 50 directly or in response to vacuum being detected by a vacuum detector, or in accordance with predetermined timing, as described herein.

What is claimed is:

1. A water treatment system comprising:
   a water tank containing iron filtration media;
   an electronic control valve associated with the water tank and including:
      a venturi nozzle in fluid communication with the upper interior of the water tank; and
      a control system having a control board programmed to enter and exit service and regeneration modes of the electronic control valve to control passage of water through the electronic control valve to and from the water tank;
   the water treatment system further comprising:
   an ozone gas generator electrically connected to a relay switch receiving electrical signalling from the control board and in response controlling access to electrical power by the ozone gas generator to start and stop generating ozone gas, the ozone gas generator conveying generated ozone gas out of an ozone gas outlet;
   a gas conduit associated with the ozone gas outlet and the venturi nozzle to convey the generated ozone gas by vacuum into the upper interior of the water tank via the venturi nozzle; and a check valve associated with the conduit to normally block flow through the conduit, the check valve openable only during the regeneration mode upon application of vacuum through the conduit from the water tank.

2. The system of claim 1, wherein the water tank contains additional media capable of further filtering out of the water at least one of: manganese and sulphur.

\* \* \* \* \*